United States Patent
Kuo et al.

(10) Patent No.: US 11,605,489 B2
(45) Date of Patent: Mar. 14, 2023

(54) INTEGRATED MAGNETIC ELEMENTS (71) Applicant: Delta Electronics, Inc., Taoyuan (TW)

(72) Inventors: Tsung-Nan Kuo, Taoyuan (TW); Lei-Chung Hsing, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 297 days.

(21) Appl. No.: 17/020,388

(22) Filed: Sep. 14, 2020

(65) Prior Publication Data
US 2020/0411225 A1 Dec. 31, 2020

Related U.S. Application Data (62) Division of application No. 15/994,007, filed on May 31, 2018, now Pat. No. 10,804,024.

(30) Foreign Application Priority Data

Oct. 17, 2017 (CN) .......................... 201710963855.8

(51) Int. Cl.
*H01F 27/28* (2006.01)
*H01F 27/245* (2006.01)
(Continued)

(52) U.S. Cl.
CPC ............ *H01F 27/245* (2013.01); *H01F 3/10* (2013.01); *H01F 3/14* (2013.01); *H01F 27/306* (2013.01); *H01F 27/38* (2013.01); *H01F 30/12* (2013.01); *H01F 37/00* (2013.01); *H02K 3/28* (2013.01); *H01F 2003/106* (2013.01); *H01F 2017/0093* (2013.01)

(58) Field of Classification Search
USPC ........................................ 336/170, 212, 213
See application file for complete search history.

(56) References Cited

U.S. PATENT DOCUMENTS 2,792,556 A * 5/1957 Oglesbee ................ H01F 38/10
336/155
3,430,025 A * 2/1969 Lazarevich ............ B23H 1/022
219/69.18

(Continued)

FOREIGN PATENT DOCUMENTS

JP 5790700 B2 10/2015

*Primary Examiner* — Ronald Hinson
(74) *Attorney, Agent, or Firm* — Muncy, Geissler, Olds & Lowe, P.C.

(57) ABSTRACT

An integrated magnetic element is provided, including a first magnetic-core frame, three second magnetic-core frames, and three coil windings. The first magnetic-core frame has a first side pillar and a second side pillar opposite to the first side pillar. The three second magnetic-core frames are arranged on the side corresponding to the first side pillar of the first magnetic-core frame, and are arranged in parallel with the axis of the first side pillar of the first magnetic-core frame. Each of the second magnetic-core frames has a first side pillar adjacent to the first side pillar of the first magnetic-core frame, and a second side pillar opposite to the first side pillar of itself. The three coil windings connect to a three-phase grid, and wind around the first side pillar of the first magnetic-core frame and the corresponding first side pillar of the second magnetic-core frame respectively.

5 Claims, 11 Drawing Sheets

(51) Int. Cl.
   *H01F 3/14*   (2006.01)
   *H01F 30/12*  (2006.01)
   *H02K 3/28*   (2006.01)
   *H01F 27/30*  (2006.01)
   *H01F 3/10*   (2006.01)
   *H01F 27/38*  (2006.01)
   *H01F 37/00*  (2006.01)
   *H01F 17/00*  (2006.01)

(56) References Cited

U.S. PATENT DOCUMENTS

| | | | |
|---|---|---|---|
| 4,019,122 A * | 4/1977 | Ryan | G05F 3/06 323/308 |
| 4,019,123 A | 4/1977 | Maskery | |
| 4,206,434 A * | 6/1980 | Hase | H01F 21/08 336/215 |
| 4,802,055 A * | 1/1989 | Beckerman | H02H 9/005 361/111 |
| 5,003,277 A | 3/1991 | Sokai et al. | |
| 5,163,173 A * | 11/1992 | Casagrande | H01F 29/146 336/155 |
| 5,376,912 A * | 12/1994 | Casagrande | H01F 27/16 336/212 |
| 5,422,620 A * | 6/1995 | Bitterli | H01F 3/10 336/215 |
| 5,789,907 A * | 8/1998 | Casagrande | G05F 7/00 336/155 |
| 6,400,249 B1 | 6/2002 | Jitaru | |
| 8,791,782 B2 | 7/2014 | Wohlforth | |
| 9,406,419 B2 * | 8/2016 | Njiende T. | H01F 41/02 |
| 10,170,231 B2 * | 1/2019 | Winkler | H01F 37/00 |
| 10,325,714 B2 * | 6/2019 | Njiende | H01F 27/06 |
| 2009/0046486 A1 | 2/2009 | Lu et al. | |
| 2009/0167473 A1 | 7/2009 | Hsieh | |
| 2012/0056704 A1 | 3/2012 | Nagano et al. | |

* cited by examiner

INTEGRATED MAGNETIC ELEMENTS

CROSS REFERENCE TO RELATED APPLICATIONS

This application, which is a Divisional application of U.S. patent application Ser. No. 15/994,007, filed on May 31, 2018, claims priority of China Patent Application No. 201710963855.8, filed on Oct. 17, 2017, the entirety of which is incorporated by reference herein.

BACKGROUND OF THE INVENTION

Field of the Invention

The application relates in general to an integrated magnetic element, and in particular to an integrated magnetic element having common-mode effect and different-mode effects at the same time.

Description of the Related Art

In recent years, power supply units and power converters have been widely used. However, when the power supply unit or the power converter is operating, a phenomenon known as electromagnetic interference (EMI) may occur due to high-frequency switching, which can affect the operation of electronic device. A common practice employed for preventing noise from entering electronic devices is to adapt a filter circuit. However, the filter circuits that are commonly used to eliminate noise have some obvious defects. For example, the magnetic core of the filter circuit is usually made of a silicon steel sheet, but the high-frequency characteristics of the silicon steel sheet are poor, and when the inductor is made of a silicon steel sheet, it has worse effect at high frequency, which means that the filtering efficiency must be enhanced with additional components. For example, in a high-level anti-EMI requirement, a pair of grounding capacitors may need to be added to the P, N input terminals in the structure of the two-phase reactor, but these capacitors may increase the leakage current and also increase the size and complexity of the device. Therefore, how to provide a magnetic element with both better common-mode and differential-mode filtering effects at the same time is a problem that needs to be solved immediately.

BRIEF SUMMARY OF INVENTION

An embodiment of the present invention provides an integrated magnetic element, including a first magnetic-core frame, three second magnetic-core frames, and three coil windings. The first magnetic-core frame has a first side pillar and a second side pillar opposite to the first side pillar. Three second magnetic-core frames are arranged on a side corresponding to the first side pillar of the first magnetic-core frame, and are arranged in parallel with the axis of the first side pillar of the first magnetic-core frame. Each of the second magnetic-core frames has a first side pillar adjacent to the first side pillar of the first magnetic-core frame, and a second side pillar opposite to the first side pillar of itself. Three coil windings are connected to a three-phase grid, and wind around the first side pillar of the first magnetic-core frame and the corresponding first side pillar of the second magnetic-core frame respectively.

Another embodiment of the present invention provides an integrated magnetic element, including a first magnetic-core frame, three second magnetic-core frames, a third magnetic-core frame, three first coil windings, and three second coil winding. The first magnetic-core frame has a first side pillar and a second side pillar opposite to the first side pillar. Three second magnetic cores are arranged on a side of the first side pillar of the first magnetic-core frame, and are arranged in parallel with the axis of the first side pillar of the first magnetic-core frame. Each of the second magnetic-core frames has a first side pillar adjacent to the first side pillar of the first magnetic-core frame, and a second side pillar opposite to the first side pillar of itself. The third magnetic-core frame is arranged on a side of the second side pillar of the three second magnetic-core frames, and has a first side pillar adjacent to the second side pillar of the three second magnetic-core frames and a second side pillar opposite to the first side pillar of itself. Three first coil windings are connected to a three-phase grid, and respectively winds around the first side pillar of the first magnetic-core frame and the corresponding first side pillar of the second magnetic-core frame. Three second coil windings respectively winds around the corresponding second side pillar of the second magnetic-core frame and the first side pillar of the third magnetic-core frame.

Another embodiment of the present invention provides an integrated magnetic element, including a magnetic-core frame, three C-type magnetic cores and three coil windings. The magnetic-core frame has a first side pillar and a second side pillar opposite to the first side pillar. Three C-type magnetic cores are arranged on a side corresponding to the first side pillar of the magnetic-core frame, and are arranged in parallel with the axis of the first side pillar of the magnetic-core frame. Each of the C-type magnetic cores has a side pillar adjacent to the first side pillar of the magnetic-core frame. The three coil windings are connected to the output terminal of a VFD (Variable-frequency Drive) system, and respectively winds around the first side pillar of the magnetic-core frame and the corresponding side pillar of the C-type magnetic core. Each of the C-type magnetic cores has a gap, located on a side opposite to the side pillar of itself, and each of the gaps has a Hall sensor disposed therein.

Another embodiment of the present invention provides an integrated magnetic element, including a magnetic-core frame, a first C-type magnetic core, a second C-type magnetic core, a first coil winding, and a second coil winding. The magnetic-core frame has a first side pillar and a second side pillar opposite to the first side pillar. The first C-type magnetic core is arranged on a side of the first side pillar of the magnetic-core frame, and has a side pillar adjacent to the first side pillar of the magnetic-core frame. The second C-type magnetic core is arranged on a side of the second side pillar of the magnetic-core frame, and has a side pillar adjacent to the second side pillar of the magnetic-core frame. The first coil winding winds around the first side pillar of the magnetic-core frame and the side pillar of the first C-type magnetic core. The second coil winding winds around the second side pillar of the magnetic-core frame and the side pillar of the second C-type magnetic core. The first C-type magnetic core has a gap located opposite to the side pillar of itself, and the second C-type magnetic core has a gap located opposite to the side pillar of itself. The first coil winding and the second coil winding have the same winding direction.

Another embodiment of the present invention provides an integrated magnetic element, including a core frame, a core module, a first coil winding, and a second coil winding. The magnetic-core frame has a first side pillar and a second side pillar opposite to the first side pillar. The core module includes an E-type magnetic core and an I-type magnetic core. The E-type magnetic core has a center pillar, a first side pillar, a second side pillar and a third side pillar. The third side pillar is perpendicular to the center pillar, the first side pillar and the second side pillar of the E-type magnetic core. The I-type magnetic core is parallel to the third side pillar of the E-type magnetic core, and is arranged on the side corresponding to the third side pillar of the E-type magnetic core. A gap between the I-type magnetic core and the first side pillar of the E-type magnetic core and a gap between the I-type magnetic core and the second side pillar of the E-type magnetic core have the same size. The first coil winding winds around the first side pillar of the magnetic-core frame and the first side pillar of the E-type magnetic core. The second coil winding winds around the second side pillar of the magnetic-core frame and the second side pillar of the E-type magnetic core. The core module and the magnetic-core frame are stacked together.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present integrated magnetic element can be applied will become apparent from the detailed description provided herein. It should be understood that the detailed description and specific examples, while indicating exemplary embodiments of the integrated magnetic element, are intended for the purposes of illustration only and are not intended to limit the scope of the invention.

Figure 1:
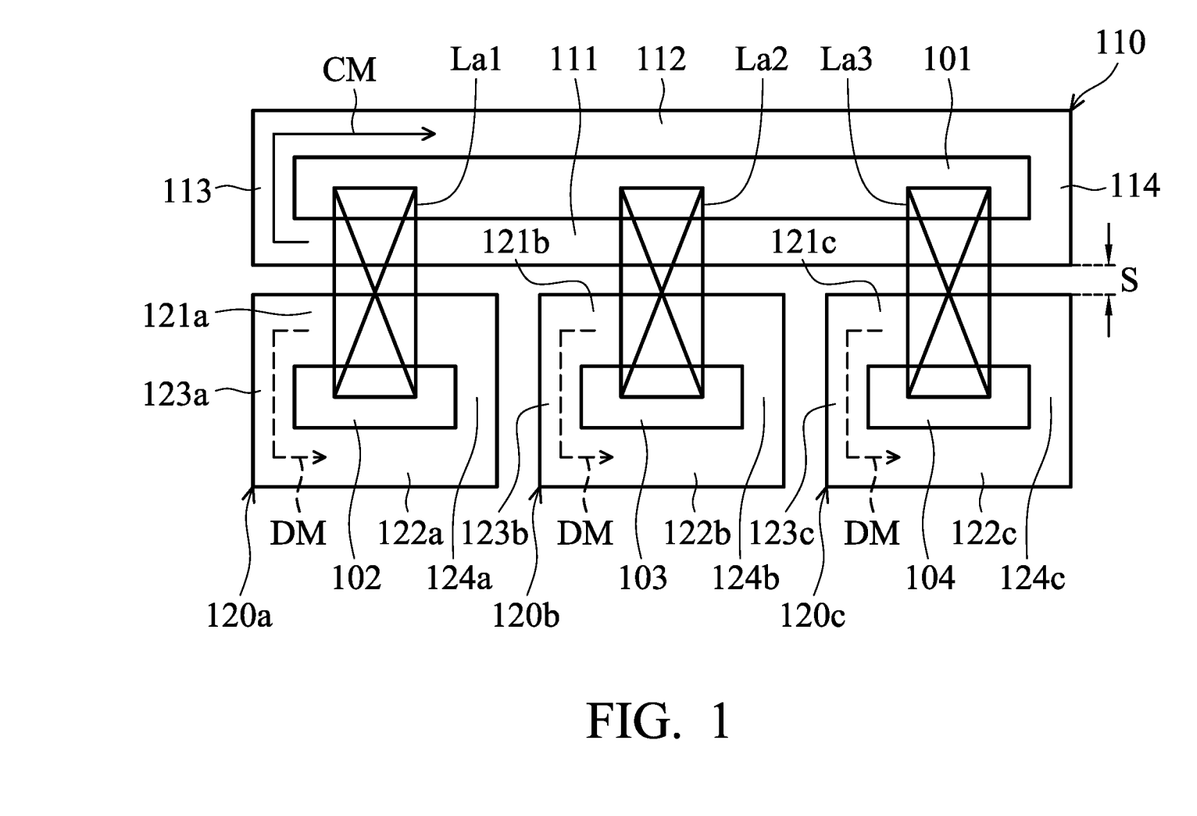
FIG. 1 is a schematic side view of a three-phase integrated reactor in accordance with a first embodiment of the present invention.

FIG. 1 is a schematic side view of a three-phase integrated reactor in accordance with a first embodiment of the present invention. The three-phase integrated reactor includes a first magnetic-core frame 110, three second magnetic-core frames 120a-120c, and three coil windings La1-La3. The first magnetic-core frame 110 provides the common-mode effect, and the second magnetic-core frames 120a-120c provide the differential-mode effect (respectively numbered as CM and DM with arrow index). Each of the first magnetic-core frame 110 and the second magnetic-core frames 120a-120c may have a close-looped magnetic circuit with any suitable shape, and each includes a window (such as the window 101, 102, 103, 104 shown in FIG. 1). It should be noted that although each of the first magnetic-core frame 110 and the second magnetic-core frames 120a-120c shown in FIG. 1 is having a rectangular shape, this is only an example of the present invention and it is not limited thereto. In addition, the windows 101-104 penetrates through the first magnetic-core frame 110 and the second magnetic-core frames 120a-120c from the side shown in FIG. 1 to the opposite side, respectively, so that the coil windings La1-La3 can wind around the magnetic-core frames 110, 120a-120c through the windows 101-104, respectively.

In this embodiment, the first magnetic-core frame 110 is formed of a first side pillar 111 and a second side pillar 112 opposite to each other, and a third side pillar 113 and a fourth side pillar 114 opposite to each other. The second magnetic-core frames 120a-120c are respectively composed of corresponding first side pillars 121a-121c and second side pillars 122a-122c opposite each other, and third side pillars 123a-123c and fourth side pillars 124a-124c opposite each other. The second magnetic-core frames 120a-120c are all provided on a side of the first side pillar 111 of the first magnetic-core frame 110, and arranged in parallel with the axis of the first side pillar 111 of the first magnetic-core frame 110, which makes the first side pillars 121a-121c of the second magnetic-core frames 120a-120c are adjacent to the first side pillar 111 of the first magnetic-core frame 110, respectively. In addition, the first magnetic-core frame 110 and each of the second magnetic-core frames 120a-120c are all spaced apart from each other by a distance S to form an air gap. In the present embodiment, the distance S of each space is the same, but this is only an example of the present invention, and it is not limited thereto.

The coil windings La1-La3 wind around the first side pillars 111 of the first magnetic-core frame 110 and the corresponding first side pillars 121a-121c of the second magnetic-core frames 120a-120c, respectively. For example, as shown in the figure, the coil winding La1 winds around the first side pillar 111 of the first magnetic-core frame 110 and the first side pillar 121a of the second magnetic-core frame 120a through the window 101 and the window 102. The coil winding La2 winds around the first side pillar 111 of the first magnetic-core frame 110 and the first side pillar 121b of the second magnetic-core frame 120b through the window 101 and the window 103. The coil winding La3 winds around the first side pillar 111 of the first magnetic-core frame 110 and the first side pillar 121c of the second magnetic-core frame 120c through the window 101 and the window 104. The winding directions of the coil windings La1-La3 are the same.

In this embodiment, the first magnetic-core frame 110 and the second magnetic-core frames 120a-120c can be made of the same material. For example, the first magnetic-core frame 110 and the second magnetic-core frames 120a-120c can be made of a silicon steel sheet or iron powder core. In another embodiment, in order to provide better high-frequency characteristics, the first magnetic-core frame 110 which having a common-mode effect can be made of manganese zinc (MnZn) or ferrite to enhance the suppression of EMI at high frequencies, and each of the second magnetic-core frames 120a-120c is made of a silicon steel sheet or iron powder core to lower the cost of production.

Figure 2:
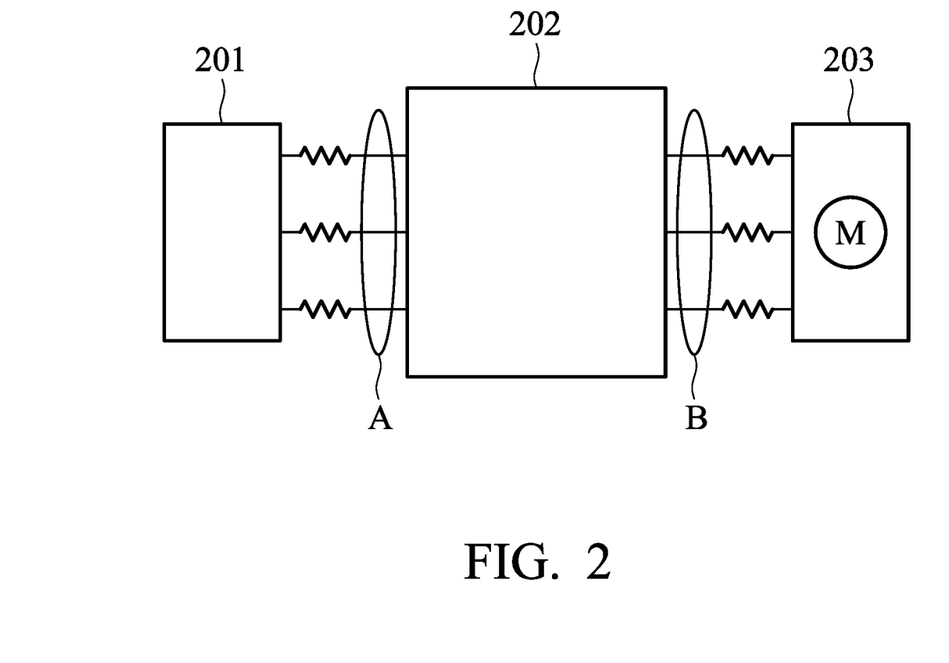
FIG. 2 is a schematic diagram of the structure of a general converter system.

FIG. 2 is a schematic diagram of the structure of a general converter system. The three-phase integrated reactor shown in FIG. 1 can be connected in series between a three-phase grid 201 and an inverter 202 (at the portion "A" shown in left part) which is shown in left part of FIG. 2 to filter the common-mode noise and the differential-mode noise generated by the three-phase grid 201.

Figure 3:
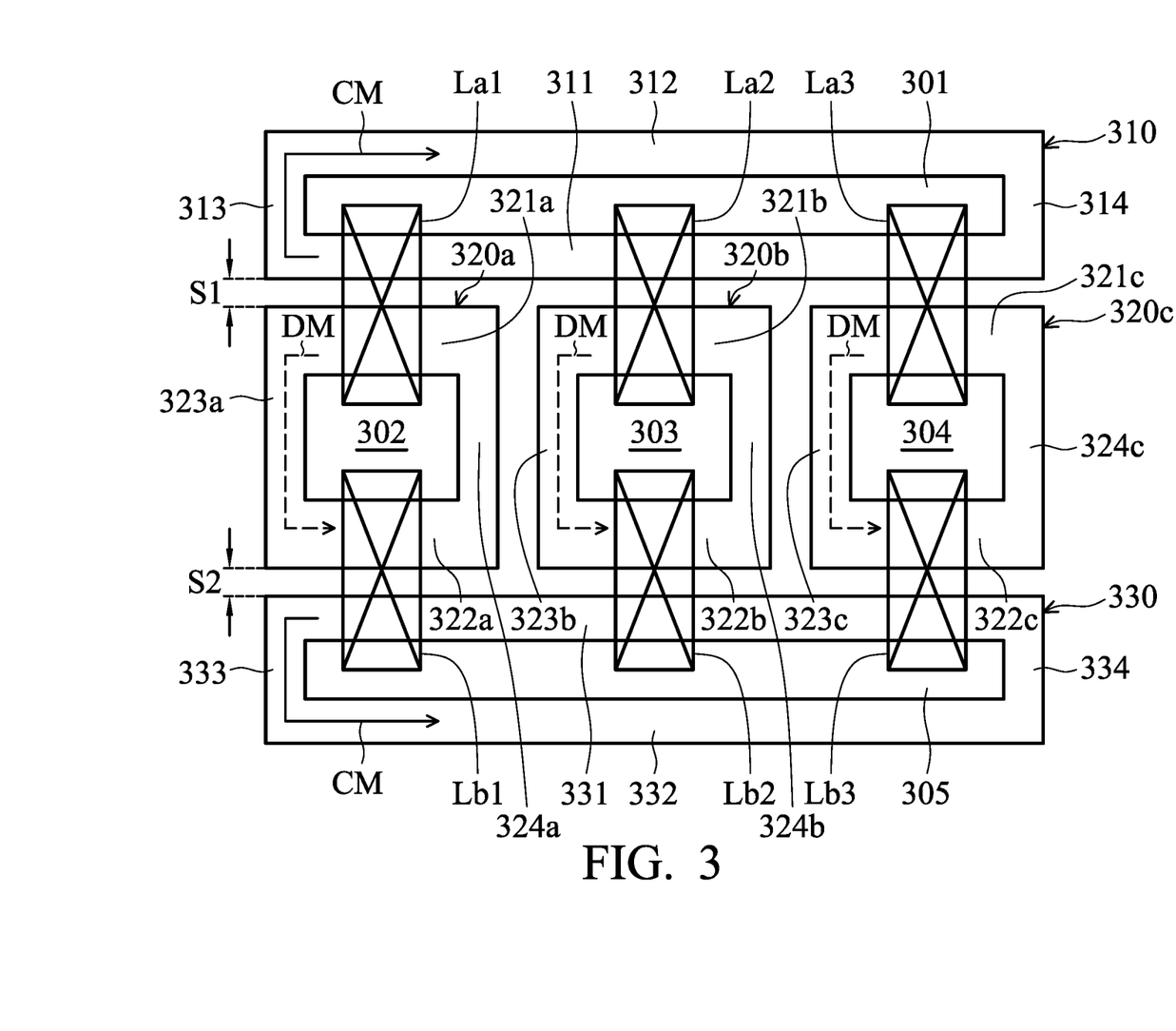
FIG. 3 is a schematic side view of a three-phase integrated reactor in accordance with a second embodiment of the present invention.

FIG. 3 is a schematic side view of a three-phase integrated reactor in accordance with a second embodiment of the present invention. The three-phase integrated reactor includes a first magnetic-core frame 310, three second magnetic-core frames 320a-320c, a third magnetic-core frame 330, three first coil windings La1-La3, and three second coil windings Lb1-Lb3. The first magnetic-core frame 310 and the third magnetic-core frame 330 are used to provide the common-mode effect while the second magnetic-core frames 320a-320c are used to provide the differential-mode effect (respectively numbered as CM and DM with arrow index). Each of the first magnetic-core frame 310, the second magnetic-core frames 320a-320c, and the third magnetic-core frame 330 has a close-looped magnetic circuit with any suitable shape, and each includes a window, respectively (windows 301, 302, 303, 304, and 305 shown in the figure). It should be noted that although each of the first magnetic-core frame 310, the second magnetic-core frames 320a-320c, and the third magnetic-core frame 330 is having a rectangular shape, but this is only an example of the present invention, and it is not limited thereto. In addition, the windows 301-305 go through the first magnetic-core frame 310, the second magnetic-core frames 320a-320c, and the third magnetic-core frame 330, respectively, from the side shown in the figure to another side, so that the coil windings La1-La3, Lb1-Lb3 can wind around the magnetic-core frames 310, 320a-320c, 330 through the windows 301-305, respectively.

In this embodiment, the first magnetic-core frame 310 is composed of a first side pillar 311 and a second side pillar 312 opposite to each other, and a third side pillar 313 and a fourth side pillar 314 opposite to each other. Each of the second magnetic-core frames 320a-320c is composed of corresponding first side pillars 321a-321c and second side pillars 322a-322c opposite to each other, and third side pillars 323a-323c and fourth side pillars 324a-324c opposite to each other, respectively. The second magnetic-core frames 320a-320c are all arranged on a first side of the first side pillar 311 of the first magnetic-core frame 310, and arranged in parallel with the axis of the first side pillar 311 of the first magnetic-core frame 310, so that the first side pillars 321a-321c of the second magnetic-core frames 320a-320c are adjacent to the first side pillar 311 of the first magnetic-core frame 310, respectively. The third magnetic-core frame 330 is composed of a first side pillar 331 and a second side pillar 332 opposite to each other, and a third side pillar 333 and a fourth side pillar 334 opposite to each other. The third magnetic-core frame 330 is arranged on a second side of each of the second side pillars 322a-322c of the second magnetic-core frames 320a-320c, so that the first side pillar 331 of the third magnetic-core frame 330 is adjacent to the second side pillars 322a-322c of the second magnetic-core frames 320a-320c, respectively. In addition, the first magnetic-core frame 310 and each of the second magnetic-core frames 320a-320c are respectively spaced apart from each other by a distance S1 to form air gaps, and the third magnetic-core frame 330 and each of the second magnetic-core frames 320a-320c are respectively spaced apart from each other by a distance S2 to form air gaps. In the present embodiment, the distances S1 and S2 are the same, but this is only an example of the present invention, and it is not limited thereto.

Each of the first coil windings La1-La3 winds around the first side pillar 311 of the first magnetic-core frame 310 and the corresponding second side pillars 321a-321c of the second magnetic-core frames 320a-320c, respectively. For example, as shown in the figure, the first coil winding La1 winds around the first side pillar 311 of the first magnetic-core frame 310 and the first side pillar 321a of the second magnetic-core frame 320a through the window 301 and the window 302. The first coil winding La2 winds around the first side pillar 311 of the first magnetic-core frame 310 and the first side pillar 321b of the second magnetic-core frame 320b through the window 301 and the window 303. The first coil winding La3 winds around the first side pillar 311 of the first magnetic-core frame 310 and the first side pillar 321c of the second magnetic-core frame 320c through the window 301 and the window 304. The winding directions of the first coil windings La1-La3 are the same.

In addition, each of the second coil windings Lb1-Lb3 winds around the corresponding second side pillars 322a to 322c of the second magnetic-core frames 320a-320c and the first side pillar 331 of the third magnetic-core frame 330. For example, as shown in the figure, the second coil winding Lb1 winds around the first side pillar 331 of the third magnetic-core frame 330 and the second side pillar 322a of the second magnetic-core frame 320a through the window 305 and the window 302. The second coil winding Lb2 winds around the first side pillar 331 of the third magnetic-core frame 330 and the second side pillar 322b of the second magnetic-core frame 320b through the window 305 and the window 303. The second coil winding Lb3 winds around the first side pillar 331 of the third magnetic-core frame 330 and the second side pillar 322c of the second magnetic-core frame 320c through the window 305 and the window 304. The winding directions of the second coil windings Lb1-Lb3 are the same, but are opposite to the winding directions of the first coil windings La1-La3.

In this embodiment, the first magnetic-core frame 310, the second magnetic-core frames 320a-320c, and the third magnetic-core frame 330 can be made of the same material. For example, the first magnetic-core frame 310, the second magnetic-core frames 320a-320c, and the third magnetic-core frame 330 can be made of the silicon steel sheet or the iron powder core. In another embodiment, in order to provide better high-frequency characteristics, the first magnetic-core frame 310 and the third magnetic-core frame 330 which having the common-mode effect can be made of manganese zinc or a ferrite material to enhance the suppression of the EMI at high frequencies, and each of the second magnetic-core frames 320a-320c is made of a silicon steel sheet or an iron powder core to lower the cost of production.

Figure 4:
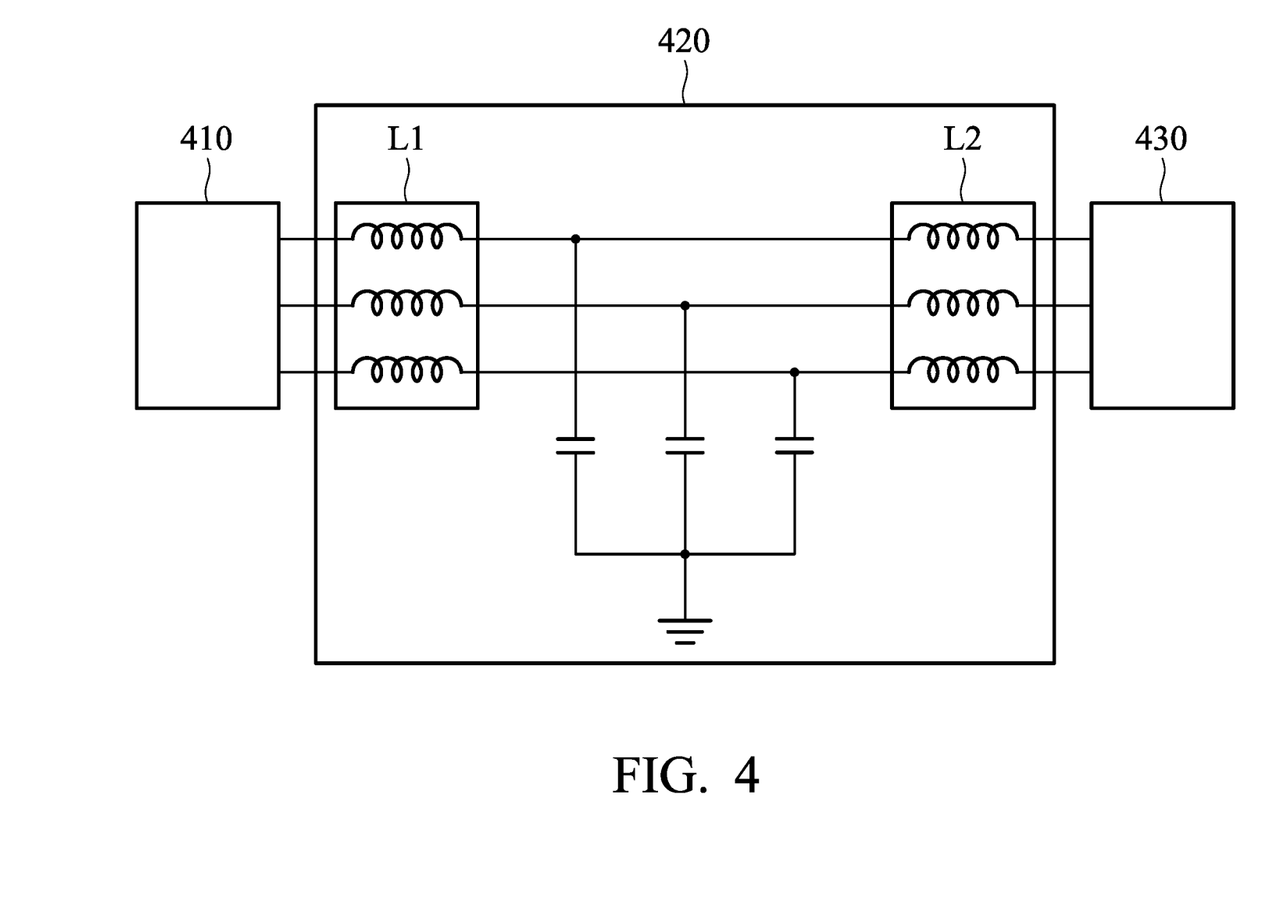
FIG. 4 is a schematic diagram of a circuit architecture having an LCL circuit.

In addition, since the three-phase integrated reactor described in the second embodiment provides two sets of inductors, in one example, the three-phase integrated reactor can be connected in series with a set of capacitors and a LCL circuit. Referring to FIG. 4, wherein FIG. 4 is a schematic diagram of a circuit architecture having the LCL circuit. The LCL circuit 420 which in combination with a three-phase integrated reactor and a set of capacitors can be connected in series between a three-phase grid 410 and an input terminal of a device 430. The device 430 can be an active front end (AFE) circuit, a REG circuit, an APF circuit, or an SVG circuit. Compared with the common LCL circuit which only has the effect of common-mode, the architecture of the LCL circuit recited in the second embodiment of the present invention has both the effect of common-mode and differential-mode at the same time, which can smooth the suddenly-increased current and raise the amount of high-frequency noise suppression.

Figure 5A:
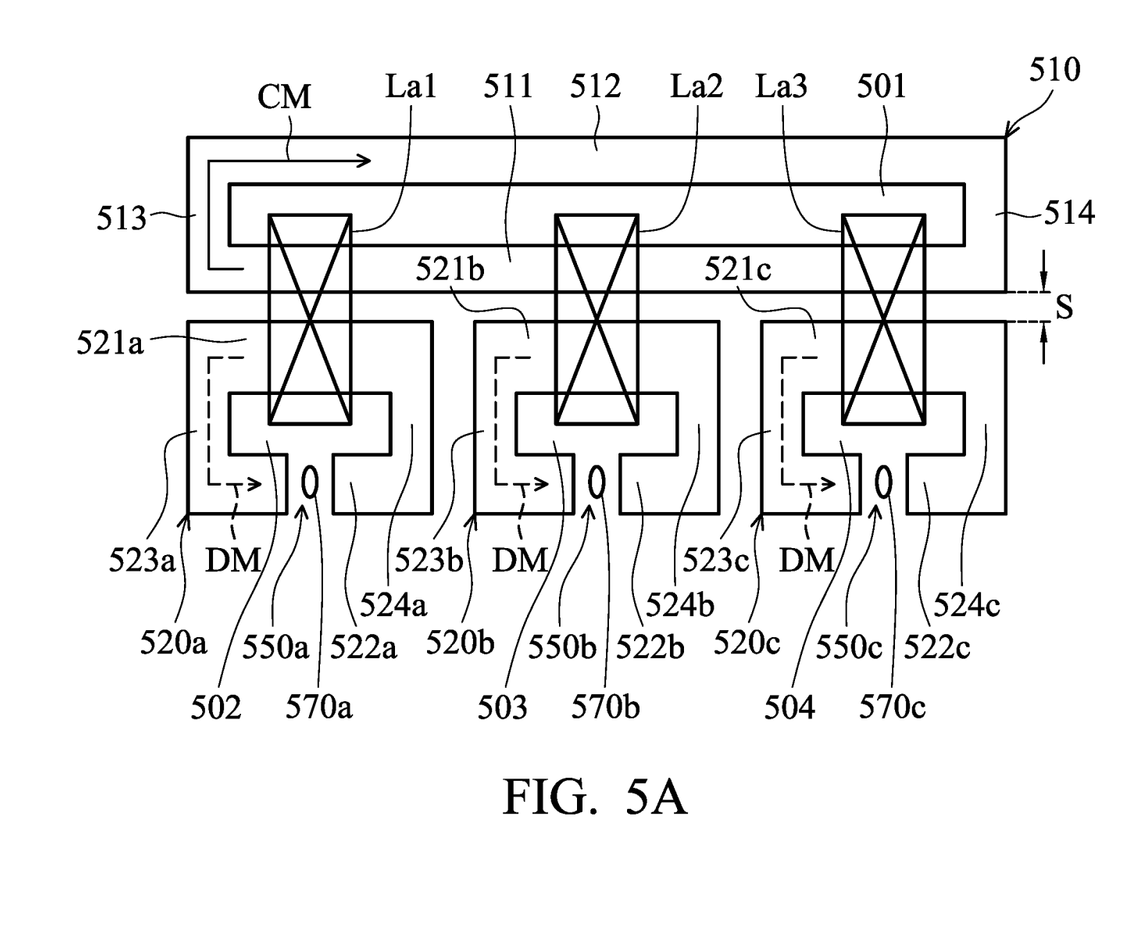
FIGS. 5A and 5B are schematic side views of an integrated three-phase current sensor common-mode choke with different air gaps in accordance with a third embodiment of the present invention.
Figure 5B:
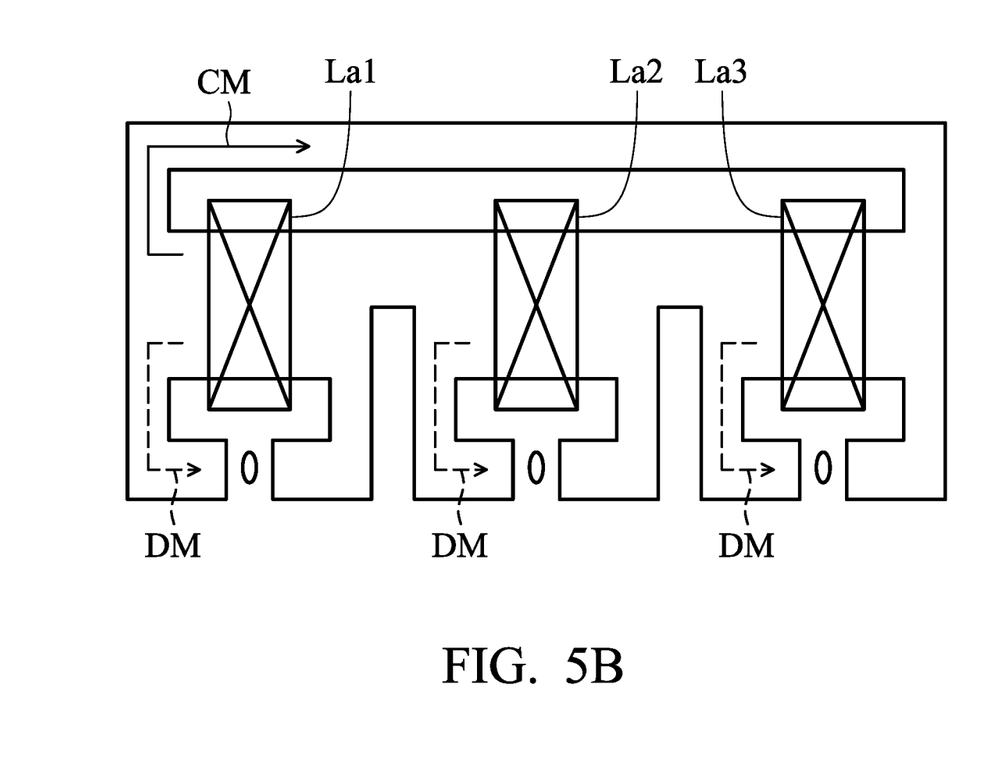

FIGS. 5A and 5B are schematic side views of an integrated three-phase current sensor common-mode choke with different air gaps in accordance with a third embodiment of the present invention. In general, the output terminal of a general VFD system has a set of Hall sensor modules for detecting variation of the current. The integrated three-phase current sensor common-mode choke described below achieves the effect of suppressing the common-mode and also provides the function of current detection. The integrated three-phase current sensor common-mode choke includes a magnetic-core frame 510, three C-type magnetic cores 520a-520c, and three coil windings La1-La3. The first magnetic-core frame 510 provides the common-mode effect while the C-type magnetic cores 520a-520c provide the differential-mode effect and current detection functions (respectively numbered as CM and DM with arrow index). The magnetic-core frame 510 can be a close-looped magnetic circuit with any suitable shape, and it includes a window 501. It should be noted that although the magnetic-core frame 510 shown in FIG. 5A is having a rectangular shape, this is only an example of the present invention and it is not limited thereto. Each of the C-type magnetic cores 520a-520c is presented as a C-shaped element and respectively includes a relative larger window 502-504 therein, and a relative smaller gap 550a-550c on the opposite sides of first side pillars 521a-521c thereof. The windows 501-504 pass through the magnetic-core frame 510 and the C-type magnetic cores 520a-520c, respectively, from one side shown in FIG. 5A to the other side, so that the coil windings La1-La3 can wind around the magnetic-core frame 510 and the C-type magnetic cores 520a-520c through the windows 501-504, respectively.

In this embodiment, the magnetic-core frame 510 includes a first side pillar 511 and a second side pillar 512 opposite to each other, and a third side pillar 513 and a fourth side pillar 514 opposite to each other. The C-type magnetic cores 520a-520c are all arranged on a side corresponding to the first side pillar 511 of the magnetic-core frame 510, and are arranged in parallel with the axis of the first side pillar 511 of the magnetic-core frame 510, so that the first side pillars 521a-521c of the C-type magnetic cores 520a-520c are adjacent to the first side pillar 511 of the magnetic-core frame 510, respectively. The magnetic-core frame 510 and each of the C-type magnetic cores 520a-520c are spaced apart from each other by a distance S to form air gaps. In the present embodiment, the distances S are the same, but these are only examples of the present invention and it is not limited thereto. Furthermore, as shown in FIG. 5B, the magnetic-core frame 510 and the C-type magnetic cores 520a-520c can be integrated into a one-piece structure by processes or other means, which means that a magnetic-core frame and C-type magnetic cores can be formed into a structure without air gaps.

In addition, Hall sensors 570a-570c are provided in each of the corresponding smaller gaps 550a-550c of the C-type magnetic cores 520a-520c respectively for sensing the magnetic field variations of the corresponding C-type magnetic cores 520a-520c. each of the coil windings La1-La3 respectively winds around the first side pillar 511 of the magnetic-core frame 510 and the corresponding first side pillars 521a-521c of the C-type magnetic cores 520a-520c. For example, as shown in the figure, the coil winding La1 winds around the first side pillar 511 of the magnetic-core frame 510 and the first side pillar 521a of the C-type magnetic core 520a through the window 501 and the window 502. The coil winding La2 winds around the first side pillar 511 of the magnetic-core frame 510 and the first side pillar 521b of the C-type magnetic core 520b through the window 501 and the window 503. The coil winding La3 winds around the first side pillar 511 of the magnetic-core frame 510 and the first side pillar 521c of the C-type magnetic core 520c through the window 501 and the window 504. The winding directions of the coil windings La1-La3 are the same.

The integrated three-phase current sensor common-mode choke described in the third embodiment can be adapted and connected in series between the output terminal of the VFD 202 and the motor 203 (such as the portion "B" shown in right part of FIG. 2) for detecting the current that drives the motor 203, and determining the switching period of the switch. The integrated three-phase current sensor common-mode choke system recited in this embodiment can be also adapted to filter noise between the VFD 202 and the motor 203.

Figure 6A:
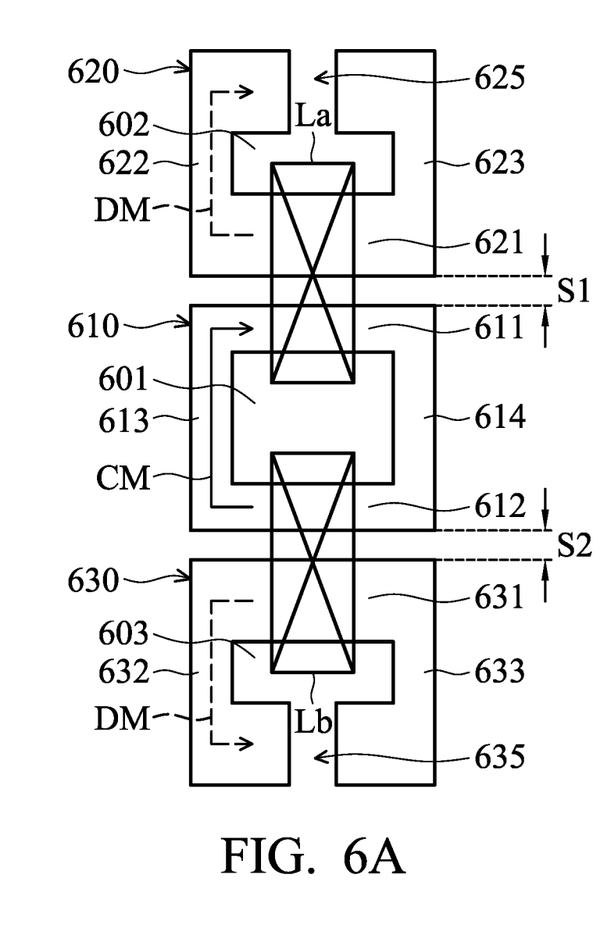
FIGS. 6A and 6B are schematic side views of a two-phase integrated reactor having different air gaps in accordance with a fourth embodiment of the present invention.
Figure 6B:
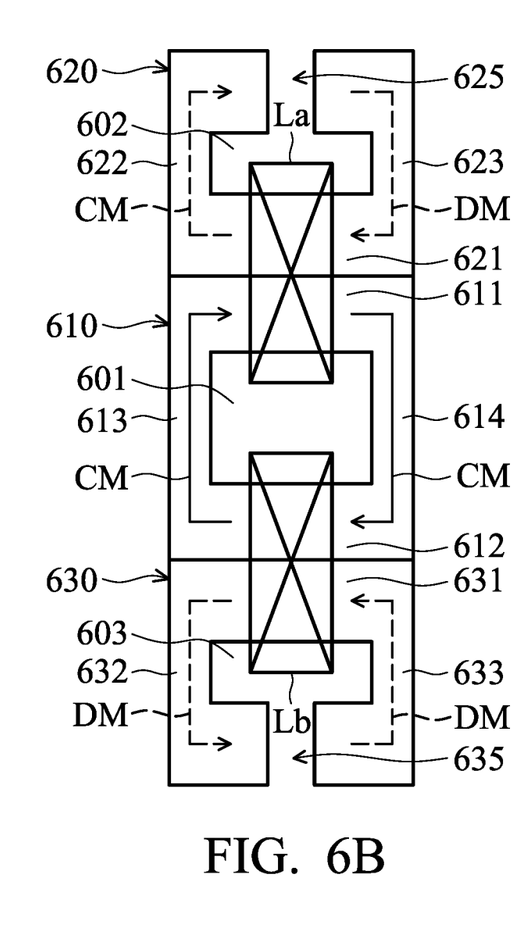

FIGS. 6A and 6B are schematic side views of a two-phase integrated reactor having different air gaps in accordance with a fourth embodiment of the present invention. The two-phase integrated reactor includes a magnetic-core frame 610, a first C-type magnetic core 620, a second C-type magnetic core 630, a first coil winding La, and a second coil winding Lb. The magnetic-core frame 610 provides the common-mode effect, and the first C-type magnetic core 620 and the second C-type magnetic core 630 provide the differential-mode effect (respectively numbered as CM and DM with arrow index). The magnetic-core frame 610 can be a close-looped magnetic circuit with any suitable shape, and it includes a window 601. It should be noted that although the magnetic-core frame 610 shown in FIG. 6A is having a rectangular shape, but this is only one example of the present invention and it is not limited thereto. Each of the first C-type magnetic core 620 and the second C-type magnetic core 630 is a C-shaped element. The first C-type magnetic core 620 includes a relative larger window 602 and a relative smaller gap 625 located at the side corresponding to the first side pillar 621 of itself. The second C-type magnetic core 630 includes a relative larger window 603 and a relative smaller gap 635 located at the side corresponding to the first side pillar 631 of itself. The windows 601-603 respectively passes through the magnetic-core frame 610, the first C-type magnetic core 620, and the second C-type magnetic core 630 from a side shown in FIG. 6A to another side, so that the coil windings La, Lb can wind around the magnetic-core frame 610, the first C-type magnetic core 620 and the second C-type magnetic core 630 through the windows 601-603, respectively.

In this embodiment, the magnetic-core frame 610 includes a first side pillar 611 and a second side pillar 612 opposite to each other, and a third side pillar 613 and a fourth side pillar 614 opposite to each other. The first C-type magnetic core 620 is disposed on a side corresponding to the first side pillar 611 of the magnetic-core frame 610, so that the first side pillar 621 of the first C-type magnetic core 620 is adjacent to the first side pillar 611 of the magnetic-core frame 610. The gap 625 of the first C-type magnetic core 620 is located at a side that is far away from the first side pillar 611 of the magnetic-core frame 610. The second C-type magnetic core 630 is disposed on a side corresponding to the second side pillar 612 of the magnetic-core frame 610, so that the first side pillar 631 of the second C-type magnetic core 630 is adjacent to the second side pillar 612 of the magnetic-core frame 610. The gap 635 of the second C-type magnetic core 630 is located at a side that is far away from the second side pillar 612 of the magnetic-core frame 610. The magnetic-core frame 610, the first C-type magnetic core 620, and the second C-type magnetic core 630 are spaced apart from each other by a distance S1 and S2 to form air gaps, respectively. In the present embodiment, the distances S1 and S2 are the same, but this is only an example of the present invention and it is not limited thereto.

The coil winding La connects to one of the P and N input terminals, and winds around the first side pillar 611 of the magnetic-core frame 610 and the first side pillar 621 of the first C-type magnetic core 620 through the window 601 and the window 602, respectively. The coil winding Lb connects to the other of the P and N input terminals, and winds around the second side pillar 612 of the magnetic-core frame 610 and the first side pillar 631 of the second C-type magnetic core 630 through the window 601 and the window 603, respectively. The winding directions of the coil windings La and Lb are the same.

In this embodiment, the magnetic-core frame 610, the first C-type magnetic core 620, and the second C-type magnetic core 630 can be made of the same material, for example, they can be made of silicon steel sheets or iron powder cores. In cases where the magnetic-core frame 610, the first C-type magnetic core 620, and the second C-type magnetic core 630 are made of the same material, it can be shown as the architecture shown in FIG. 6B. In this embodiment, there is a special case that no air gap between the magnetic-core frame 610 and the first C-type magnetic core 620 or between the magnetic-core frame 610 and the second C-type magnetic core 630. That is, the magnetic-core frame 610, the first C-type magnetic core 620, and the second C-type magnetic core 630 can be integrated into a one-piece structure, but it is not limited thereto. In another embodiment, in order to provide better high-frequency characteristics, the magnetic-core frame 610 having the common-mode effect can be made of manganese zinc or ferrite to increase EMI suppression at high frequencies. The first C-type magnetic core 620 and the second C-type magnetic core 630 can be made of a silicon steel sheet or iron powder core to lower the cost of production.

Figure 7:
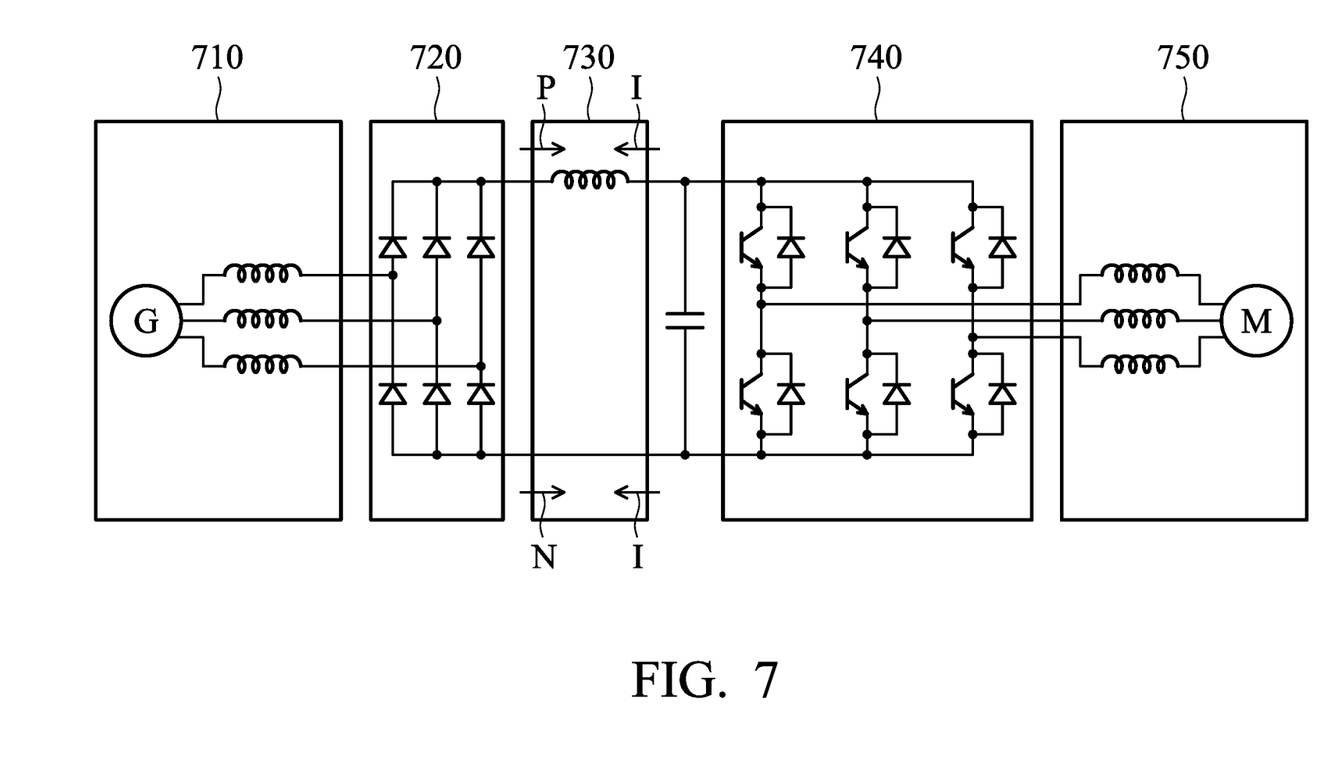
FIG. 7 is a schematic diagram of the structure of a general VFD system.

In the fourth embodiment, the two-phase integrated reactor can be adapted as a reactor for the DC link PN input terminal in an inverter. FIG. 7 is a schematic diagram of the structure of a general VFD system. As shown in FIG. 7, the two-phase integrated reactor 730 described in the fourth embodiment is connected in series between a rectifier 720 and an inverter 740, and the system may further include a three-phase grid 710 located at the front end and a motor 750 at the rear end respectively. In the conventional technique, only one reactor is provided at the PN input terminal, so that the inductance of the common-mode is low and therefore has less effective for the common-mode. However, the two-phase integrated reactor of the present invention significantly increases the inductance of the common-mode at the high frequency. In addition, the two-phase integrated reactor can also be applied to the REG circuit to block the circular current that flows back to the three-phase grid.

Figure 8:
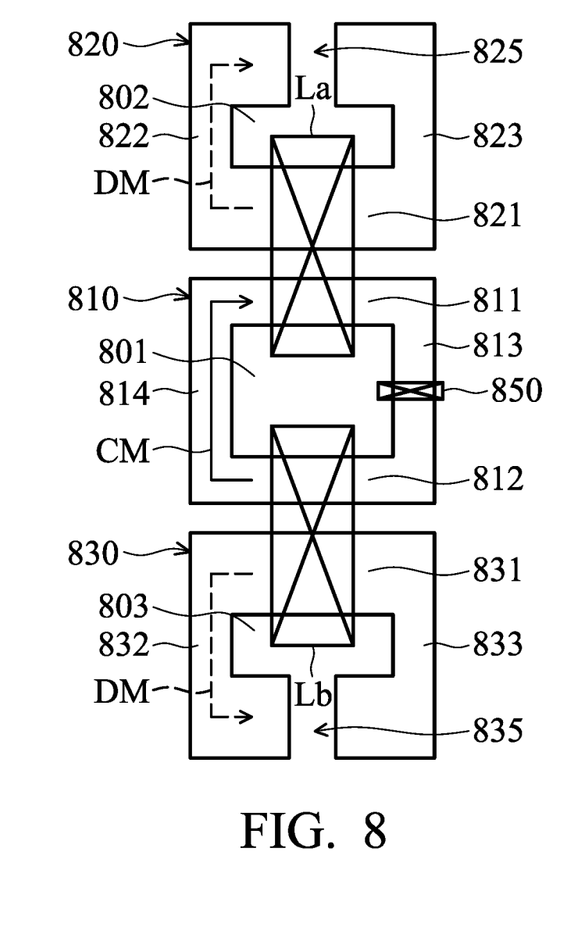
FIG. 8 is a schematic side view of a two-phase integrated reactor having a ground fault detection function in accordance with a fifth embodiment of the present invention.

According to an embodiment of the present invention, the PN current might be unbalanced due to the erroneous operation during the transformer is operated, which might cause a ground fault in the machine or system. Therefore, in order to detect the abnormal situation of PN current as soon as possible, a coil winding can be added to the magnetic-core frame 610 of the two-phase integrated reactor described in the fourth embodiment to detect the current at the PN terminal. For example, as shown in FIG. 8, FIG. 8 is a schematic side view of a two-phase integrated reactor having a ground fault detection function in accordance with a fifth embodiment of the present invention. The structure of the magnetic-core frame 810, the first C-type magnetic core 820, the second C-type magnetic core 830, the first coil winding La, and the second coil winding Lb shown in FIG. 8 are substantially the same as the two-phase integrated reactor shown in FIG. 6A, thus it is not described herein to simplify the description. An additional coil winding 850 is added at the third side pillar 813 of the magnetic-core frame 810 to sense the current at the PN terminal. The coil winding 850 is further connected to a controller (not shown), but it is not applied with the current, and is only used for sensing the current. The sensed current signal will be transmitted to the controller to execute the preventive process.

Figure 9A:
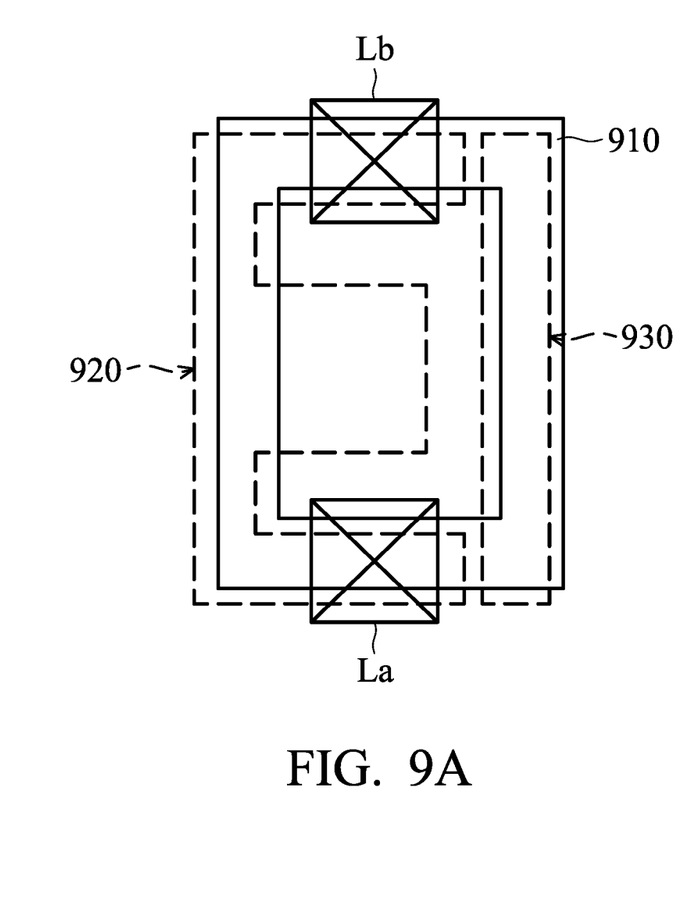
FIG. 9A is a schematic side view of an enhanced differential-mode and common-mode reactor in accordance with a sixth embodiment of the present invention.
Figure 9B:
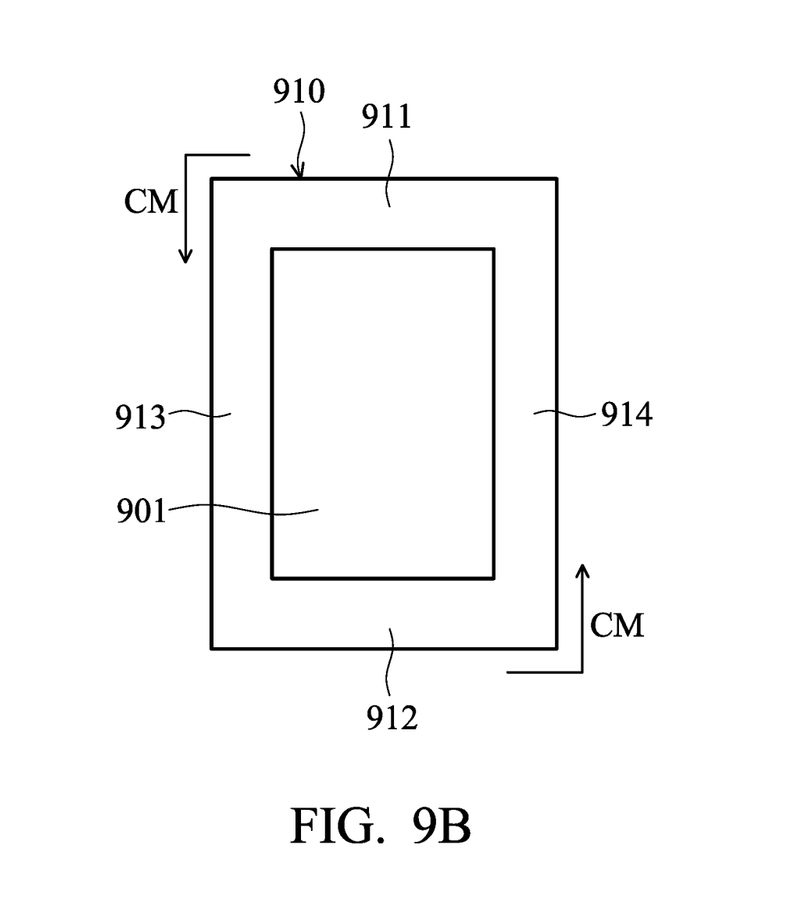
FIG. 9B is a schematic side view of a magnetic-core frame of the enhanced differential-mode and common-mode reactor in accordance with the sixth embodiment of the present invention.
Figure 9C:
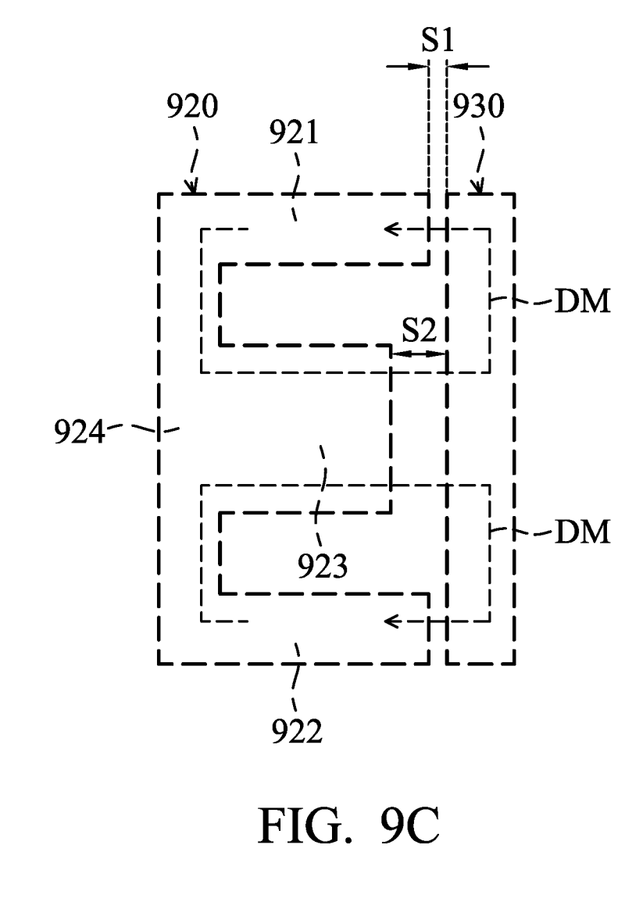
FIG. 9C is a schematic side view of a core module of the enhanced differential-mode and common-mode reactor in accordance with the sixth embodiment of the present invention.

FIG. 9A is a schematic side view of an enhanced differential-mode and common-mode reactor in accordance with a sixth embodiment of the present invention. FIG. 9B is a schematic side view of a magnetic-core frame of the enhanced differential-mode and common-mode reactor in accordance with the sixth embodiment of the present invention. FIG. 9C is a schematic side view of a core module of the enhanced differential-mode and common-mode reactor in accordance with the sixth embodiment of the present invention. As shown in the figure, the enhanced differential-mode common-mode reactor includes a magnetic-core frame 910, a core module, a first coil winding La, and a second coil winding Lb. The magnetic-core frame 910 and the core modules are stacked together vertically, which means that the magnetic-core frame 910 overlaps the core module in a projection direction. The magnetic-core frame 910 is used to provide the common-mode effect (numbered as CM with arrow index shown in FIG. 9B) and the core module provides the differential-mode effect (numbered as DM with arrow index shown in FIG. 9C), and the differential-mode current shown in the dotted line is drawn back from the center pillar of the core module to the side pillar of the core module. The structure of the core module will be described in detail later. As shown in FIG. 9B, the magnetic-core frame 910 can be a close-looped magnetic circuit with any suitable shape, and it includes a window 901. The magnetic-core frame 910 includes a first side pillar 911 and a second side pillar 912 opposite to each other, and a third side pillar 913 and a fourth side pillar 914 opposite to each other. Although the magnetic-core frame 910 shown in FIG. 9B is having a rectangular shape, but this is only an example of the present invention and it is not limited thereto.

As shown in FIG. 9C, the core module includes an E-type magnetic core 920 and an I-type magnetic core 930. The E-type magnetic core 920 includes a first side pillar 921, a second side pillar 922, a center pillar 923, and a third side pillar 924. The first side pillar 921, the second side pillar 922, and the center pillar 923 are substantially parallel to each other, and the first side pillar 921 and the second side pillar 922 are located at opposite sides of the center pillar 923, respectively. In addition, the first side pillar 921, the second side pillar 922, and the center pillar 923 are all perpendicular to the third side pillar 924. The I-type magnetic core 930 is provided on a side corresponding to the third side pillar 924 of the E-type magnetic core 920, and the first side pillar 921 and the second side pillar 922 of the E-type magnetic core 920 and the I-type magnetic core 930 are spaced apart from each other by a distance S1 to form air gaps, respectively, in order to facilitate the adjustment of the magnetic properties. In detail, the distances S1 between the first side pillar 921 or the second side pillar 922 of the E-type magnetic core 920 and the I-type magnetic core 930 are the same, and the distances S1 can be adjusted based on the configuration of the I-type magnetic core 930 and the E-type magnetic core 920, that is, the air gaps between the I-type magnetic core 930 and the E-type magnetic core 920 can be adjusted. In the present embodiment, the center pillar 923 of the E-type magnetic core 920 is shorter than both the first side pillar 921 and the second side pillar 922 of the E-type magnetic core 920 (as shown in FIG. 9C, the distance S1 is smaller than the distance S2), but this is only an example of the present invention and it is not limited thereto.

Referring to FIGS. 9A, 9B and 9C, the coil winding La winds around the first side pillar 911 of the magnetic-core frame 910 and the first side pillar 921 of the E-type magnetic core 920 through the window 901 of the magnetic-core frame 910. The coil winding Lb winds around the second side pillar 912 of the magnetic-core frame 910 and the second side pillar 922 of the E-type magnetic core 920 through the window 901 of the magnetic-core frame 910. The winding directions of the coil windings La and Lb are the same.

In this embodiment, the magnetic-core frame 910 and the core module can be made of the same material, for example, they can be made of the silicon steel sheets or the iron powder cores. In another embodiment, in order to provide a better common-mode effect, the magnetic-core frame 910 can also be made of the manganese zinc or the ferrite, and the core module is made of the silicon steel sheets or the iron powder core to enhance the high-frequency common-mode effect and to lower the production costs.

As described above, according to the various integrated magnetic elements of embodiments of the present invention, it is possible to achieve the effects of suppressing the common-mode noise and the differential-mode noise at the same time without placing an extra capacitor for increasing the EMI suppression effect in the VFD system, which can avoid the sides effects that the capacitor might generate a large leakage current or high voltage noise will be entered into the capacitor. In addition, the design of the system design can be simplified to reduce the size and the costs of the system or the device.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An integrated magnetic element, comprising:
    a magnetic-core frame, having a first side pillar and a second side pillar opposite to the first side pillar;
    a first C-type magnetic core, arranged on a side of the first side pillar of the magnetic-core frame, and having a side pillar adjacent to the first side pillar of the magnetic-core frame;
    a second C-type magnetic core, arranged on a side of the second side pillar of the magnetic-core frame, and having a side pillar adjacent to the second side pillar of the magnetic-core frame;
    a first coil winding, winding around the first side pillar of the magnetic-core frame and the side pillar of the first C-type magnetic core; and
    a second coil winding, winding around the second side pillar of the magnetic-core frame and the side pillar of the second C-type magnetic core;
    wherein the first C-type magnetic core has a gap located opposite to the side pillar of itself, and the second C-type magnetic core has a gap located opposite to the side pillar of itself; and
    wherein the first coil winding and the second coil winding have the same winding direction.

2. The integrated magnetic element as claimed in claim 1, wherein the integrated magnetic element is provided in a VFD system.

3. The integrated magnetic element as claimed in claim 2, further comprising:
    a third coil winding, winding around a third side pillar of the magnetic-core frame, and connected to a controller for sensing a current of the magnetic-core frame;
    wherein the third side pillar of the magnetic-core frame is perpendicular to the first side pillar and the second side pillar of the magnetic-core frame.

4. The integrated magnetic element as claimed in claim 1, wherein the magnetic-core frame, the first C-type magnetic core, and the second C-type magnetic core are made of the same material.

5. The integrated magnetic element as claimed in claim 1, wherein the magnetic-core frame is made of a different material than the first C-type magnetic core or the second C-type magnetic core.

* * * * *